United States Patent [19]
Pearsall

[11] 3,718,902
[45] Feb. 27, 1973

[54] VEHICLE SEAT BELT ALARM AND STARTER INTERLOCK CONTROL SYSTEM

[75] Inventor: Gerald Robert Pearsall, Farmington, Mich.

[73] Assignee: Irvin Industries Inc., Greenwich, Conn.

[22] Filed: Dec. 6, 1971

[21] Appl. No.: 205,209

[52] U.S. Cl. .................. 340/52 E, 340/278, 307/10, 180/82 C
[51] Int. Cl. ............................................. B60r 21/10
[58] Field of Search ............. 340/52 E, 278; 307/10; 180/82 C

[56] References Cited
UNITED STATES PATENTS 3,340,523  9/1967  Whitman .......................... 340/278
3,449,714  6/1969  Farley, Jr. ......................... 340/52 E Primary Examiner—Alvin H. Waring
Attorney—Lloyd McAulay

[57] ABSTRACT

A source of voltage is connected to a starter interlock through a normally open seat switch and a first normally closed seat belt actuated switch. Closing of the seat switch when a passenger sits connects the voltage to the interlock and disables the starter mechanism. Buckling the seat belt opens the seat belt actuated switch and enables the starter mechanism. The voltage is also connected to the starter interlock through the series combination of the normally opened seat switch and a normally closed relay switch. Battery voltage is coupled to the relay switch coil through a second normally open seat belt actuated switch and a capacitor in series. Buckling of the seat belt causes a pulse of current to be transmitted through the capacitor to energize the relay coil thereby opening the normally closed relay switch. A holding circuit through the seat switch maintains the relay switch open. Thus, the seat belt must be buckled after sitting down in order to provide the pulse of current to initially close the relay switch and to provide the continuing current to keep the relay closed. While the vehicle is in use, a warning buzzer and warning light are actuated by the same voltage source which disables the starting circuit.

16 Claims, 3 Drawing Figures

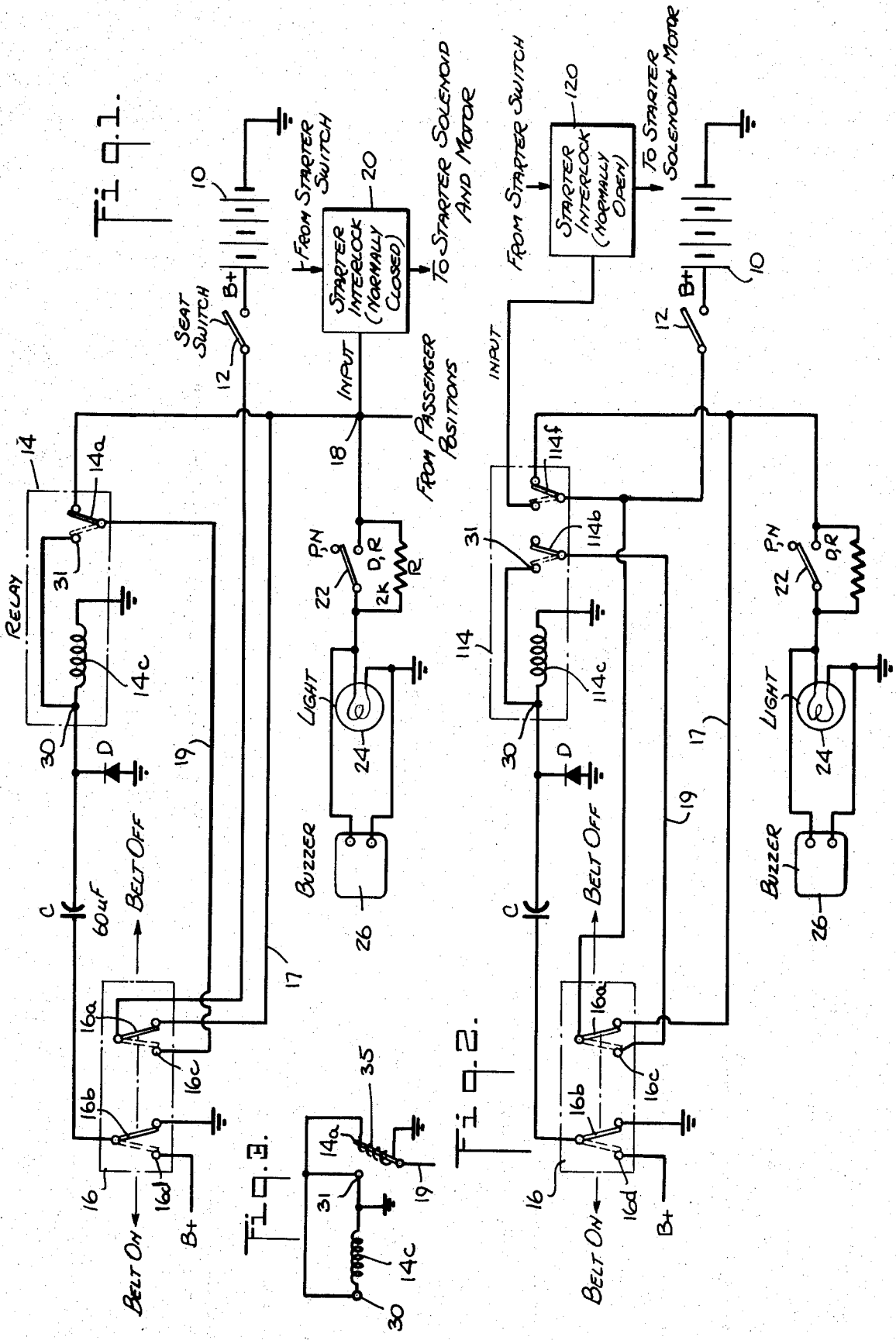

VEHICLE SEAT BELT ALARM AND STARTER INTERLOCK CONTROL SYSTEM

This invention relates in general to a system for requiring that a seat belt be closed before an automotive vehicle can be started and in particular that the seat belt be closed at a time and under a condition which will provide a high degree of assurance that the seat belt is buckled about the passenger before the vehicle can be started.

BACKGROUND OF THE INVENTION

At the time of this invention, the usage of an electrical switch which had to be actuated by the fastening of the seat belt as a prerequisite to turning on the car motor, was known. One such system is described in pending patent application Ser. No. 85,343, filed Oct. 10, 1970, and entitled "Safety Seat Belt System", which application is assigned to the assignee of the instant application. Briefly, the above-referenced application describes a system in which a normally opened seat switch is closed when a passenger (the driver when he sits in the driver's seat or some non-driver passenger in other seats) sits down. The closing of this normally opened seat switch completes an electric circuit that energizes a relay in a starter interlock circuit, which relay in turn opens the starter circuit. The seat belt associated with the seat having the seat switch operates a second switch. When the seat belt is fastened, the seat belt actuated switch performs a circuit function that deenergizes the relay in the starter interlock circuit. The deenergization of the starter interlock relay enables the starter circuit and the car's starter motor can be turned on. A major limitation of the usefulness of such a seat belt and starter interlock system is that it can be readily defeated by having the seat belts maintained in a coupled or fastened position regardless of whether or not a passenger is in the seat involved. The driver and/or passengers simply sit on the buckled belts or ignores them whenever entering the car. Because the coupled seat belts results in a de-energized starter interlock relay, the driver sitting on his seat and closing his seat switch has no effect on the disabling interlock relay because the circuit that would energize the disabling relay is maintained open by virtue of the fact that the seat belt is maintained coupled.

Accordingly, it is a major purpose of this invention to provide an improvement in the seat belt starter interlock system that will prevent defeating the system by keeping the seat belt continuously coupled.

More particularly, it is a purpose of this invention to provide an improved system that will require the fastening of the seat belt after the driver or other passenger has sat down in the car.

It is a further and important purpose of this invention that the above purposes be achieved with a system that is simple, inexpensive and reliable so that its use will be acceptable to both automobile manufacturer and purchaser.

It is a further related purpose of this invention to provide such an improved system that will be sufficiently difficult to defeat or compromise so that the driver and passenger will find it more convenient to fasten the seat belt around themselves rather than go to the trouble of compromising or ignoring the system.

BRIEF DESCRIPTION OF THE INVENTION

In brief, this invention involves the use of a capacitor to couple one side of a seat belt actuated switch to the coil of a relay switch. The other side of the seat belt actuated switch is connected to the automobile battery. When the seat belt is uncoupled, the battery is not connected to the capacitor. Thus, in the process of buckling the seat belt a pulse of current is applied to the capacitor and, because it is a pulse, applied through the capacitor to the coil of the relay switch to energize the relay switch. The relay switch when not energized provides a closed circuit (through the relay switch contacts) between the seat switch and the starter interlock. The seat switch when closed, as when a driver or passenger is seated in the car, connects battery voltage to the relay switch contacts and, when the relay switch is not energized, through the relay switch contacts to the starter interlock. This battery voltage at the input to the starter interlock energizes and thus opens the normally closed interlock relay thereby opening the circuit between the start switch and the starter solenoid so that the car cannot be started.

The only way, then, to start the car is to buckle the seat belt which will provide a pulse of current through the capacitor to the relay coil thereby switching the state of the relay switch and opening the circuit between the seat switch and the starter interlock.

A holding circuit in the relay switch maintains the relay switch energized after the pulse of current has initially energized the relay switch.

If the seat belt is maintained in a buckled condition on a continuous basis, including when the car is not in use, for the purpose of defeating this requirement that the seat belt be buckled to energize the relay switch, then what happens is that after the driver or passenger is seated the starter interlock has voltage applied to it to open the starter interlock. But no pulse of current is applied to the capacitor because there is no buckling of the seat belt and thus no change in the voltage on the capacitor to provide a pulse that can be transmitted through the capacitor to the relay coil. All that happens is that the battery voltage applied to the capacitor is a steady state voltage that is blocked by the capacitor from access to the coil of the relay switch. To start the vehicle will then require unbuckling the seat belt and rebuckling it.

BRIEF DESCRIPTION OF THE DRAWINGS

FIG. 1 is an electrical schematic of a preferred embodiment of this invention.

FIG. 2 is an electrical schematic of a second embodiment of this invention.

FIG. 3 is an electrical schematic illustrating the electrical connections of the heater element for the bimetallic arm of the time delay relay switch employed in FIGS. 1 and 2.

DESCRIPTION OF THE PREFERRED EMBODIMENTS

Normal Operation of the FIG. 1 Embodiment

FIG. 1 is an electrical schematic of a preferred embodiment of the device of this invention. As shown therein, a battery 10 is connected to one terminal of a normally opened seat switch 12. Assuming that the seat switch 12 is the switch in the seat used by the driver, then when the driver enters the car and sits down, his weight will close the switch 12. On closing the switch 12, the positive terminal of the battery 10 is connected to a first switch arm 16a of a seat belt actuated switch 16. When the belt is unbuckled, the switch arm 16a has the state shown in solid line in FIG. 1. Thus, when the driver sits down, he closes the seat switch 12 and battery voltage is connected through the switch arm 16a to the point 18, which point 18 serves an an input to the starter interlock 20.

When a voltage is applied as an input to the starter interlock 20, a normally closed relay (not shown) in the interlock 20 is opened to open the circuit through the interlock 20 so that the closing of the start switch will not apply voltage to the starter solenoid and the car cannot be started.

In addition, if the driver turns the transmission setting from either the park or neutral position P, N to either the drive or reverse position D, R, then the switch arm 22 will be moved from the open position, as shown, to a closed position. With the driver's seat switch 12 closed, this will complete a circuit through the point 18 that applies voltage from the battery 10 to a warning light 24 and to a warning buzzer 26 to provide visual and auditory indications to the driver that the seat belt has not been connected and that the car cannot be started.

Now, if after the driver has seated himself, he then fastens the seat belt, the state of the seat belt switch 16 changes from the normal condition shown (where the switch arms 16a and 16b are shown in solid lines) to the condition where the switch arms 16a and 16b are in the position shown in dotted line in FIG. 1. Such a change in the position of the switch arms of the seat belt actuated switch 16 does two things.

First, the change in position of switch arm 16a opens the path along the line 17 from battery 10 to point 18 and at the same time connects battery 10 to point 18 through the line 19 and relay arm 14a.

Second, the change in position of switch arm 16b applies battery voltage through the switch arm 16b to the capacitor C. Because of this switching action of the switch 16, the voltage applied to the capacitor C is seen as the leading edge of a pulse that is transmitted through the capacitor C and to the coil 14c of the relay switch 14. Since it is a positive pulse, the diode D will not conduct. This pulse energizes the coil 14c and switches the state of the relay 14 from that shown in solid line in FIG. 1 to the state shown in dotted line in FIG. 1.

The switching of the relay switch 14a causes B+ voltage to be applied on the line 19 from the battery 10 to the coil 14c, thereby providing a holding circuit so that the coil 14c stays energized even though the pulse of current transmitted through the capacitor C terminates. The switching of the relay switch arm 14a further results in opening the circuit through the line 19 from the battery 10 to the point 18. As a result, the voltage at the point 18 drops and the starter interlock 20 is de-energized, thereby closing the circuit through the interlock 20 so that actuation of the start switch will start the motor. At the same time, since there is no longer voltage at the point 18, the switching of the switch arm 22 from the park or neutral P, N position shown to the drive or reverse D, R position does not light the light 24 nor cause the buzzer 26 to sound.

Assuming the Seat Belt Is Left Buckled Permanently (FIG. 1)

The above is a description of the normal operation of this invention. However, the important point about the relationship of the elements shown is that they serve to inhibit any attempt to defeat the purpose of this system which is to cause a driver to fasten his seat belt. Assume, therefore, that the seat belt actuated switch 16 is placed in the "belt-on" state by fastening the seat belt and causing the seat belt to lie on the seat without having it around the driver. When the driver then gets into the car and sits down, he closes the seat switch 12 which then applies voltage to the point 18, through the switch arms 16a, 14a, thereby opening the interlock 20. Now, since the battery 10 has been connected all along, through the switch arm 16b, to the left side of the capacitor C, there is no way in which to energize the relay coil 14c. Thus there is no way to change the state of the relay switch 14 and the car cannot be started. The driver must open the seat belt and close it again in order to get a pulse of current through the capacitor C to switch the state of the relay 14. Only then will voltage be removed from the point 18 because of the switching of relay arm 14a. Accordingly, the use of the capacitor C in the position shown in combination with the seat belt switch 16, relay switch 14 and seat switch 12 creates a condition which tends to assure that the driver will buckle the seat belt around himself because it is simplier to do such than to try to defeat the purpose of the system.

The Dual Arm Seat Belt Actuated Switch (FIG. 1)

The seat belt actuated switch 16 has two switch arms 16a and 16b that perform two separate functions. The function of the switch arm 16a is to assure that the seat belt is in fact buckled when the motor is started. The function of the switch arm 16b is to make sure that the seat belt is buckled after the driver has been seated and has closed the seat switch 12. These are two different functions. The former function is a state function and the latter function is a sequencing function. Unless both functions are provided, it is possible for the driver to defeat the system without actually maintaining the seat belt buckled.

For example, in one embodiment, the seat belt actuated switch 16 is in the retractor mechanism. In that embodiment, the act of pulling the seat belt web out of the retractor rotates a cam that throws the switch 16 from the belt-off position shown in FIG. 1 to the belt-on position. Thus, if the driver were simply to pull out the web an adequate distance and let it fall back he would switch the arm 16b to the contact 16d, provide a pulse to the capacitor C and succeed in energizing the coil 14c and thus would open the circuit through the relay arm 14a to the point 18 from the seat switch 12. But with the existence of the contact arm 16a as shown, it becomes necessary to keep the seat belt in the belt-on state in order to prevent voltage from being applied through the contact arm 16a and line 17 to the point 18 and also in order to maintain the holding circuit closed for the relay coil 14c.

Furthermore, if the seat belt is unbuckled while the car is in operation, such will apply a voltage to the point 18 and cause the warning light 24 to become lit and the warning buzzer 26 to sound.

The switch 22 is tied to the automatic drive selector mechanism. When starting up the car, the switch 22 is in the park or neutral P, N position and any voltage at the point 18 will open the interlock 14 to prevent the motor from being started. However, under that condition, the 2,000 ohm resistor will prevent enough current from flowing through to actuate either the buzzer 26 or light 24.

During operation of the vehicle, the switch 22 is closed and any unbuckling of the seat belt will cause battery voltage to be applied through the switch arm 16a over the line 17 to the point 18 and thus through the switch 22 to turn on the warning light 24 and sound the warning buzzer 26.

The relatively high resistance resistor R serves to make sure that any leakage, such as through the interlock 20, is bled to ground during the operation of the vehicle. This makes sure that there is no unwanted build-up of voltage at the point 18 during normal operation. This condition might occur where the interlock is solid state circuitry.

Time Delay Feature

The relay 14 preferably has a time delay feature that delays the opening of the relay 14 when voltage is removed from the coil 14c. This time delay feature is important to avoid unnecessarily causing the buzzer 26 to sound and the light 24 to turn on during the normal operation of the vehicle when the seat switch 12 might momentarily open. If the vehicle were being driven over a bumpy road, the driver might be lifted off his seat sufficiently to open the switch 12. Without the time delay feature this would cause a distracting and undesirable warning sound. Indeed, if the seat switch 12 were so opened, the holding circuit to the coil 14c would be broken and the relay switch arm 14a would then close the circuit to the point 18. The subsequent closing of the seat switch 12 would cause a continuing action of the warning light 24 and buzzer 26, requiring that the seat belt be uncoupled and recoupled in order to provide an energizing pulse for the relay coil 14c.

One means of providing this time delay feature is for the arm 14a to be made of bi-metallic material. A heating element 35 (see FIG. 3) is mounted on the arm 14a and is connected at one end to ground and at the other end to the point 30, which point 30 is the high voltage end of the relay coil 14c. When the switch arm 14a is in the position shown in FIG. 1, no battery voltage is applied to the relay coil 14c and thus the heating element around the switch arm 14a receives no current and the switch arm 14a is cool. When the relay coil 14c is energized, the arm 14a is electromagnetically switched to the position shown in dotted lines in FIG. 1. Once in that position, the relay is held in its energized state by the holding circuit through the belt-on position of the switch arm 16a. The heating coil is thus connected across the battery and heats the bi-metallic switch arm 14a. This causes the switch arm 14a to bend tighter against the contact 31. When the seat switch 12 is opened, the heated bi-metallic arm 14a remains against the contact 31 for a period of 5 to 10 seconds before cooling off and snapping open. This heating element 35 is shown separately in FIG. 3 and is omitted from FIGS. 1 and 2 in order to avoid confusion in illustration.

Alternatively to a bi-metallic contact 14a, time delay can be established by switching in a capacitor across the coil 14c when the coil 14c is energized.

The grounding of the switch arm 16b is important to make sure that the voltage on the capcitor C is bled off when the seat belt is opened so that the subsequent buckling of the seat belt will be effective to provide a pulse of current through the capacitor C. This energizing pulse for the coil 14c may not be adequately transmitted by the capcitor C if that capcitor C has any significant residual voltage on it.

When the seat belt is being opened, the diode D together with switch arm 16b completes a circuit through ground allowing a reverse surge of current through capacitor C until both sides of the capacitor C are at ground voltage thus preparing the capacitor for the next surge of current when the seat belt is again buckled.

The above description has been made assuming that the seat switch 12 and seat belt actuated switch 16 were associated with the driver's seat. One of the advantages of the FIG. 1 embodiment is that the entire circuit arrangement upstream from the point 18 can be duplicated for as many seats in the vehicle as it is desired to cover by this seat belt interlocking arrangement. A separate seat switch 12, seat belt actuated switch 16, capacitor C, relay switch 14 and other associated circuitry would have to be provided for each passenger seat to be covered. Each such circuit arrangement would then be connected to the point 18. If any one of the seats thereby covered had a passenger who did not properly buckle his seat belt, the resulting voltage at the point 18 would open the starter interlock 14. Each of the passengers would have to seat himself and then buckle his seat belt in order for the point 18 to have the required zero voltage level that permits starting the motor. Similarly, if any one of the passengers opened his seat belt during the use of the vehicle, the resulting voltage at point 18 would cause the light 24 and buzzer 26 to operate.

The capacitor C in one embodiment is 600 microfarads and the resistance of the relay coil 14c is 1,575 ohms. Use of a capacitor as large as this provides a RC time constant sufficiently great so that relay 14 will not be turned on by relatively small voltage fluctuations that might be induced in the system and transmitted through the capcitor C. For example, the use of a capacitor as large as indicated means that an expedient such as flashing the lights on and off will not provide a pulse that might energize the relay coil 14c.

Although the above description illustrates an electromechanical relay 14, it should be understood that other relays, including a solid state relay could be employed. It should also be understood that the seat belt actuated switch 16 could be positioned and actuated in a number of fashions. For example, the switch 16 could require completion of the buckling. Alternatively, the switch 16 could be in the retractor mechanism and actuation of the switch occur when the webbing is pulled out of the retractor by a predetermined amount. Indeed, the switch arms 16a and 16b could well be associated with two separately placed switches. Thus, the switch arm 16a could be in the retractor while the switch arm 16b is in the buckle.

The important function of the switch arm 16b is to provide a pulse in response to the process of buckling the seat belt. The FIG. 1 embodiment shown is a simple and preferred embodiment. As one variant thereon, it is possible to limit the switching of the switch arm 16b to a short period of time during the process of buckling. For example, assume the case where this switch 16 is actuated by pulling the web out of the seat belt retractor. It is feasible for a cam that actuates solely the switch arm 16b to actuate the switch arm 16b at the point where the web is approximately one-fourth of the distance out of the retractor and then to have the switch arm 16b return to the position shown in FIG. 1 when the web is three-fourths of the distance out of the retractor. The result would be a pulse of current that will switch the state of the relay 14.

It should further be understood, particularly with reference to the claims, that the state of the seat belt actuated switch 16a when the seat belt is unbuckled refers to the condition where the seat belt web is completely returned to the retractor or is in whatever normal condition exists after unbuckling. Similarly, the state of the seat belt actuated switch 16a when the seat belt is buckled is the state when the seat belt is completely and normally buckled. Obviously, the transition between these two states may well occur during the process of buckling. This is particularly true where the seat belt actuated switches are actuated by the movement of the webbing out of the retractor. But is is the normally buckled and normally unbuckled end conditions that are referred to herein.

Alternate Embodiment (FIG. 2)

FIG. 2 illustrates a variant of the FIG. 1 embodiment which is less preferred because it can be conveniently used only in connection with the driver's seat. In FIG. 2, the same reference numbers are used as in FIG. 1, where the parts are identical. When the part differs, a parallel reference number, one hundred higher in FIG. 2, is used.

In FIG. 2 the starter interlock 120 includes a normally opened relay that is closed upon receipt at the input terminal of battery voltage. Only when this normally open interlock is closed can the start switch serve to energize the starter solenoid and turn on the motor.

In this FIG. 2 embodiment, the relay switch 114 must have two switch arms, as shown. The holding circuit for the coil 114c is provided through the bi-metallic switch arm 114b and the switch 16a when in the belt-on position.

In the FIG. 2 arrangement, the only way to apply battery voltage to the starter interlock 120 to close the starter interlock 120 is to close the seat switch 12 and energize the relay 114 so that the switch arm 114f is switched from the position shown in solid line in FIG. 2. In normal operation, the driver takes his seat and closes seat switch 12. He then buckles his belt, switching the arm 16b to the terminal 16d and applying a pulse of current through the capacitor C to the relay coil 114c. This switches the arm 114f to apply the required battery voltage that closes the starter interlock 120. At the same time, the arm 114b completes a holding circuit for the coil 114c through the line 19, the contact 16c and the arm 16a.

An attempt to defeat this arrangement by maintaining the seat belt buckled will, for the same reasons as in the FIG. 1 embodiment, prevent the pulsing of the relay 114 that is necessary to effect initial switching of the arms 114f and 114b.

Opening the seat belt during vehicle operation will connect voltage through contact 16a and line 17 to the warning system that includes the light 24 and buzzer 26.

What is claimed is:

1. In a vehicle seat belt and starter interlock system wherein the interlock has an enabling state that enables the start switch to start the motor and a disabling state that prevents the start switch from starting the motor, the state of the interlock being a function of the state of the electrical input applied, from an electrical source, to an input to the interlock, the improvement for assuring that the seat belt is fastened subsequent to the passenger seating himself in the vehicle, comprising:

a seat switch having a first state when no passenger is seated and having a second state in response to the seating of a passenger in the seat involved, a first seat belt actuated switch having a first state when the seat belt is unbuckled and having a second state when the seat belt is buckled, a second seat belt actuated switch responsive to the process of buckling the seat belt to change state during said process, a relay switch having a first state and a second state, said relay switch having an actuating input, a capacitor electrically coupled between said actuating input of said relay switch and said second seat belt actuated switch, said change of state of said second seat belt actuated switch providing an electrical pulse through said capacitor to force said relay into its second state, and a holding circuit to hold said relay in its second state, the holding circuit including said seat switch and said first seat belt actuated switch, said holding circuit being open when said seat switch is in its first state or when said first seat belt actuated switch is in its first state, said second state of said seat switch in combination with said first state of said relay switch providing a first state electrical input at the interlock to cause the interlock to be maintained in its disabling state.

2. The interlock system of claim 1 wherein:

said first seat belt actuated switch is switched from its first state to its second state during the buckling of said seat belt at a point in time no later than when said second seat belt actuated switch changes state during the process of buckling.

3. The interlock system of claim 1 further comprising:

a warning system operable when the vehicle is in a predetermined drive state, said second state of seat switch in combination with said first state of said first seat belt actuated switch causing said warning system to be actuated.

4. The interlock system of claim 2 further comprising:

a warning system operable when the vehicle is in a predetermined drive state, said second state of seat switch in combination with said first state of said first seat belt actuated switch causing said warning system to be actuated.

5. The interlock system of claim 1 further comprising:

time delay means to hold said relay in its second state for a predetermined time period after said holding circuit is opened.

6. The interlock system of claim 2 further comprising:
time delay means to hold said relay in its second state for a predetermined time period after said holding circuit is opened.

7. The interlock system of claim 3 further comprising:
time delay means to hold said relay in its second state for a predetermined time period after said holding circuit is opened.

8. The interlock system of claim 4 further comprising:
time delay means to hold said relay in its second state for a predetermined time period after said holding circuit is opened.

9. In a vehicle seat belt and starter interlock system wherein a normally closed interlock is opened by an input voltage to the interlock from a source of voltage, the interlock when opened prevents the start switch from starting the motor, the improvement for assuring that the seat belt is fastened subsequent to the passenger seating himself in the vehicle, comprising:
a normally open seat switch that closes in response to the seating of a passenger,
a first seat belt actuated switch having a first state when the seat belt is unbuckled and having a second state when the seat belt is buckled,
said seat switch when closed and said first seat belt actuated switch when in said first state providing a path between the source of voltage and the interlock to open the interlock,
a relay switch having a first state and a second state, said relay switch having an actuating input,
said seat switch when closed, said first seat belt actuated switch when in said second state and said relay switch when in said first state providing a path between the source of voltage and the input to the interlock to open the interlock,
a second seat belt actuated switch responsive to the process of buckling the seat belt to change state during said process,
a capacitor electrically coupled between said actuating input of said relay switch and said second seat belt actuated switch,
said change of state of said second seat belt actuated switch providing an electrical pulse through said capacitor to force said relay into its second state, and
a holding circuit to hold said relay in its second state, the holding circuit including said seat switch and said first seat belt actuated switch,
said holding circuit being open when said seat switch is open or when said first seat belt actuated switch is in its first state.

10. The interlock system of claim 9 wherein:
said first seat belt actuated switch is switched from its first state to its second state during the buckling of said seat belt at a point in time no later than when said second seat belt actuated switch changes state during the process of buckling.

11. The interlock system of claim 9 further comprising:
a warning system operable when the vehicle is in a predetermined drive state,
said second state of seat switch in combination with said first state of said first seat belt actuated switch causing said warning system to be actuated.

12. The interlock system of claim 10 further comprising:
a warning system operable when the vehicle is in a predetermined drive state,
said second state of seat switch is in combination with said first state of said first seat belt actuated switch causing said warning system to be actuated.

13. The interlock system of claim 9 further comprising:
time delay means to hold said relay in its second state for a predetermined time period after said holding circuit is opened.

14. The interlock system of claim 10 further comprising:
time delay means to hold said relay in its second state for a predetermined time period after said holding circuit is opened.

15. The interlock system of claim 11 further comprising:
time delay means to hold said relay in its second state for a predetermined time period after said holding circuit is opened.

16. The interlock system of claim 12 further comprising:
time delay means to hold said relay in its second state for a predetermined time period after said holding circuit is opened.

* * * * *